United States Patent [19]

Green

[11] 4,070,643
[45] Jan. 24, 1978

[54] ACOUSTIC HOLOGRAPHY APPARATUS

[75] Inventor: David Trevor Green, Banbury, England

[73] Assignee: National Research Development Corporation, London, England

[21] Appl. No.: 698,779

[22] Filed: June 22, 1976

[30] Foreign Application Priority Data

June 26, 1975  United Kingdom ............ 27189/75

[51] Int. Cl.² .............................................. G01S 9/66
[52] U.S. Cl. ...................................... 340/5 H; 73/604
[58] Field of Search .................... 340/5 H; 73/67.5 H

[56] References Cited
U.S. PATENT DOCUMENTS 3,678,452  7/1972  Silverman ........................ 340/5 H
3,774,203  11/1973  Dooley ........................... 340/5 H Primary Examiner—Richard A. Farley
Attorney, Agent, or Firm—Cushman, Darby & Cushman

[57] ABSTRACT

Apparatus and method for forming acoustic hologram patterns, comprising a receiver transducer for detecting acoustic waves scattered by an object, a scanning system for moving the receiver relative to the object, a sampling system for taking samples of a signal derived from the receiver transducer at selected instants relative to the phase of the acoustic signals at the transmitter, the selected instants being determined according to the phase of a chosen notional reference wave at the position of the receiver transducer relative to the phase of the chosen notional reference wave at a datum point, and a system for plotting the samples versus the displacement of the receiver transducer so as to form a graphical diagram representing an acoustic hologram of the object. The receiver signals are preferably applied to a phase-locked frequency-multiplier circuit and the samples taken from the output of this circuit. The sampling system may include a switch circuit arranged to apply a series of predetermined voltages in sequence to a comparator controlling a sampling gate.

12 Claims, 7 Drawing Figures

ACOUSTIC HOLOGRAPHY APPARATUS

The present invention relates to acoustic holography apparatus and techniques.

In optical holography, an optical interference pattern formed by the interaction of coherent reference waves and waves scattered from or diffused by a coherently illuminated object is recorded photographically. The recording is called a hologram, and an image of the object can be reproduced by illuminating the hologram with the reference waves. The reference waves and the waves used to illuminate the object are generally derived from a single coherent light source by using a beam splitter. Optical holography with visible light can be used to reveal minute distortions in the surface of an object, but cannot show internal defects in any object which is opaque to the light used. However, acoustic waves and particularly ultrasonic acoustic waves can penetrate opaque objects and can be used to form hologram patterns which can show internal features or defects. The acoustic hologram pattern is converted into a sequence of electrical signals, generally by a scanning receiver transducer which is moved in a rectilinear raster fashion over a plane aperture. The transducer signals are recorded by an $x$-$y$ plotter so as to form a visible representation of the hologram, which is then reproduced on a reduced scale by photographic means. The reduced pattern forms a hologram such as might have been obtained with visible light of much shorter wavelength than the acoustic waves, if the object had been translucent to such light. A three-dimensional image of the object, showing internal features, may then be reproduced by illuminating the reduced hologram with visible light forming reference waves having a relationship with the reduced hologram comparable to the relationship between the acoustic reference waves and the acoustic hologram pattern originally formed in the scanned plane.

However, in acoustic holography, instead of using an acoustic reference wave an equivalent effect may be obtained by combining the output of the scanning receiver transducer with electronic reference signals simulating the responses which the transducer would have produced in response to a chosen reference wave which might have been used. The electronic reference signals have been derived by suitable phase displacements of the signals used to energise the transmitter transducer which is needed to insonify the object with acoustic waves. To simulate a reference wave having plane wavefronts incident at an acute angle to the scanned plane, the phase displacements applied must be a function of the position of the scanning receiver transducer.

The phase displacements have been produced in prior equipments by analogue-signal phase-shifting circuits, but this has the disadvantage that such phase-shifting circuits are frequency-sensitive and will need resetting if the transmitter frequency drifts or is deliberately changed. Moreover, it may be desirable to simulate a skewed reference wave incident at an acute angle to both coordinate directions of the scanning motion, which requires the phase displacements to be additionally shifted between each line of the scan and the next. An analogue circuit arrangement with facilities for simulating skewed reference waves and for variable frequency selection would be rather more complex.

In practice it may be difficult or impossible to reduce the scale by the ideal amount, that is by a factor of $\lambda_2/\lambda_1$ where $\lambda_1$ is the wavelength of the acoustic waves used to obtain the hologram and $\lambda_2$ is the wavelength of coherent light used to obtain the reproduction. It is usual just to make the greatest convenient reduction; the insufficient reduction, or out-of-proportion reproducing illumination produces a distorted but still useful image. The reproduction can be improved to some extent by using or simulating acoustic reference waves at grazing incidence to form the hologram and using visible reproducing light at nearly normal incidence, but the distortion due to insufficient reduction still detracts from the quality and complicates the interpretation of the image.

It is an object of the invention to provide an alternative apparatus and method for acoustic holography which is convenient for use at various acoustic frequencies and can simulate the effects of skewed reference waves. It is another object to provide a preferred form of the invention giving hologram patterns providing less distorted images after a given reduction, or needing less reduction to achieve an image with a given degree of distortion.

According to the present invention there is provided acoustical holography apparatus for recording acoustical holograms wherein the hologram record is formed from samples taken of or derived from the output of a receiver transducer, each sample being taken in a time much shorter than a period of the acoustic signal used and taken at a time selected relative to the phase of the acoustic signal used, the selection being determined according to the relative phase of a chosen notional reference wave at the position of the receiver transducer. In the preferred form of the apparatus the receiver-transducer output is applied to a phase-locked frequency-multiplier circuit and it is the output of the phase-locked frequency-multiplier circuit which is sampled to form the hologram record.

The apparatus may include an oscillator, a transmitter transducer energised by the oscillator, and a receiver transducer which is moved in a scanning motion across a given plane to detect the pattern formed in the given plane by acoustic signals from the transmitter transducer after scattering by a test object, and a recording plotter for recording and reproducing a hologram pattern from the output signals of the apparatus, as in conventional equipment; but it may be distinguished by having the receiver transducer connected to the recording plotter via a high-speed analogue signal sampling gate which is controlled by a scan control circuit, so that the sampling gate will take samples at times when the oscillator signal phase reaches a phase angle which is selected by the scan control circuit and has a predetermined relationship to the instantaneous position of the receiver transducer. In the preferred form of the apparatus the receiver transducer output is connected to the phase-locked frequency-multiplier circuit and the output of the phase-locked frequency-multiplier circuit is sampled by the high-speed analogue-signal sampling gate to form the signals which are applied to the recording plotter. The scan control circuit may include means for applying a series of predetermined voltages in sequence to one input of a comparator amplifier whose other input is connected to receive the oscillator signal, and means for deriving appropriate sampling control signals from the output of the comparator amplifier. As a special case the scan control circuit may be arranged to present just one predetermined voltage to the comparator, but in general it will provide a sequence of voltages related to each other as a sequence of instantaneous voltage samples taken at equal phase increments from a sinusoidal waveform. The scan control circuit may control a scan mechanism for moving the receiver transducer in steps, and counting means for selecting appropriate voltages in accordance with the stepping motion of the receiver transducer.

According to the present invention in another aspect thereof, there is provided a method for forming an acoustic hologram pattern which includes insonifying a test object with acoustic waves from a transmitter transducer, detecting the acoustic waves scattered by the test object with a receiver transducer, sampling an output of or derived from the receiver transducer at selected phase times relative to the phase of the acoustic waves at the transmitter, scanning the receiver transducer across a plane and selecting the said phase times according to a prescribed relationship with the instantaneous position of the receiver transducer, and forming the hologram by plotting the sampled outputs obtained with the receiver transducer in various positions in the plane at corresponding positions in a diagram of the plane.

It is well known in the art that a plurality of receiver transducers may be used to reduce the scanning motion needed; signals from each of an array of fixed transducers may be taken in sequence instead of taking the response of a single transducer moved in steps. It is also known that the transmitter transducer may be moved instead of moving the receiver transducer, or both may be moved in unison; such arrangements should therefore be considered mechanical equivalents, within the scope of the invention herein claimed.

The operation, construction and advantages of embodiments of the invention will now be more fully explained and illustrated by way of example only, with reference to the accompanying drawings of which:

Figure 1:
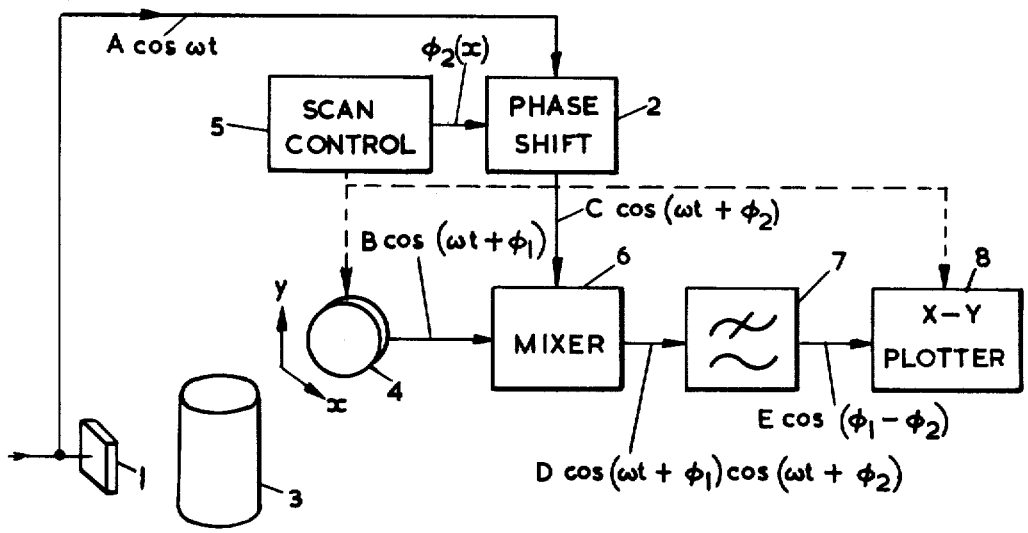
FIG. 1 is a schematic block circuit diagram of prior acoustic holography apparatus.

In the known apparatus of FIG. 1, sinusoidal signals A cos $wt$ are fed to an ultrasonic transmitting transducer 1 and to a variable phase-shifting circuit 2. The ultrasonic waves transmitted from the transducer 1 are attenuated and delayed by an object 3 which is to be tested, so that the signal received at any point $(x, y)$ in a scanned plane will have the form B cos $(wt + \phi_1)$ where $x$ and $y$ are Cartesian coordinates and B and $\phi_1$ will vary with $x$ and $y$ depending on the configuration of the object 3. These signals are detected by a receiver transducer 4 which is moved to scan over a desired area of the plane. Preferably, the transducer 4 will be of the focused (concave) type so that its response at any instant represents the signal over an elementary area of the scanned plane. A scan control unit 5 controls the motion of the receiver transducer 4 and the amount of phase-shift $\phi_2$ applied to the signal A cos $wt$ by the variable phase-shifting circuit 2, so that the output A cos $(wt + \phi_2)$ will simulate the response which the transducer 4 would have had to a prescribed reference wave. For instance, to simulate a plane reference wave incident at an angle $\alpha$ to the $x$-axis, $\phi_2$ may be made equal to $2 a\pi x/\lambda$ where $\lambda$ is the wavelength of the ultrasonic waves and $a = \cos \alpha$. The actual signals from the transmitter transducer 4 and the simulated reference signals from the phase-shift circuit 2 are multiplied together in a mixer circuit 6. The output from the mixer 6 is applied to a low-pass filter 7. The signals passed to the output of the filter 7 will then represent E cos $(\phi - \phi_2)$ and are recorded by an $x$-$y$ plotter 8 at a point on the recorder paper representing the position of the receiver transducer. As the transducer 4 is moved over the chosen area, these records are accumulated to form the desired hologram pattern.

Figure 2:
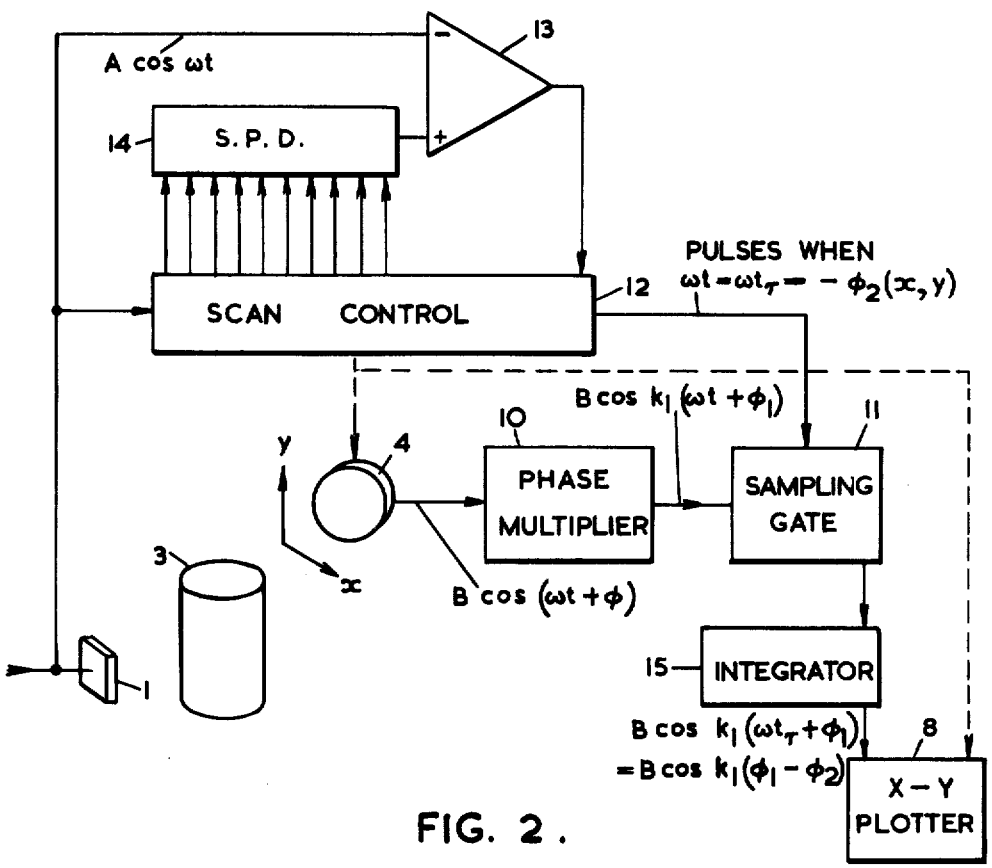
FIG. 2 is a schematic block circuit diagram of acoustic holography apparatus which is an embodiment of the present invention.

In FIG. 2, the object 3 and transducers 1 and 4 are arranged as before, but instead of being multiplied by an electronic reference signal the output of the receiver transducer 4 is processed by a phase multiplier circuit 10 and then sampled by a sampling gate circuit 11 at times selected by the action of a scan control circuit 12 and a comparator circuit 13. The scan control circuit 12 controls the scanning motion of the receiver transducer 4 as in FIG. 1 and also controls a switched potential divider 14 so that it will apply an appropriate reference voltage to one input of the comparator circuit 13.

The switched potential divider 14 comprises a plurality of potential divider networks in series with gate circuits which are energised one at a time in sequence by the scan control circuit 12, so that the common output connection of the divider circuit 14 applies a voltage $A \cos \phi_2 = A \cos 2\pi (a x + b y)$ to the comparator 13 where $x$ and $y$ are coordinates of the instantaneous position of the receiver transducer 4 and $a$ and $b$ are direction cosines (with respect to the $x$ and $y$ axes of the transducer's scanning motion) of the direction of incidence of the reference wave which is to be simulated. The scan control unit 12 includes a logic circuit controlling gates connected between the output of the comparator 13 and the sampling gate circuit 11 so that the phase multiplier output will be sampled and passed to the output line when and only when $wt = \phi_2$. The phase multiplier 10 is a phase-locked frequency-multiplier circuit which produces an output at a harmonic of the frequency of the signal which it receives, phase-locked to its input signal. Thus in response to the signal B cos $(wt + \phi_1)$ from the transducer 4 the phase multiplier 10 will provide a signal B cos $k_1 (wt + \phi_1)$. This may be achieved by a balanced mixer connected to receive the transducer signal on both inputs and act as a frequency doubler, eg a type SN56/76514 circuit used as described in Texas Instruments Ltd Application Report B84, making $k_1 = 2$. Conceivably two such circuits could be used in cascade to make $k_1 = 4$. Alternatively the phase multiplier 10 could be replaced by a direct connection making $k_1 = 1$.

The sampled output will be a voltage equal to the value of B cos $k_1 (wt + \phi_1)$ when $wt = -\phi_2$, which is B cos $k_1 (\phi_1 - \phi_2)$. If $k = 1$ this is clearly equivalent to the output of the conventional arrangement of FIG. 1. Samples will be taken in a sequence of cycles at each position of the receiver transducer 4 and will be integrated by an integrating circuit 15. Measurements will be taken in each of a multitude of positions of the receiver transducer 4, the integrating circuit being reset after each measurement has been plotted by the x-y plotter 8. The measuring positions are chosen so that they will require specific values of $\phi_2$ differing by eqaul phase increments, Thus only specific values of $A \cos \phi_2$ (for example values of $A \cos \cdot (\pi p/10)$ where $p = 0, 1, 2, \ldots\ldots 9$) are needed, and the appropriate value is selected by counting.

This sampling arrangement is advantageous as it is substantially independent of frequency, and can therefore be used without adjustment for tests at various acoustic frequencies. The simulation of a skewed reference ($b \neq 0$ in the formula determining $\phi_2$) can also be arranged quite easily in this system. The inclusion of the phase multiplier 10 brings in the factor $k_1$ which reduces the amount of scale reduction ideally required for reproduction by light of a given wavelength $\lambda_2$, also reducing the distortion caused in practical non-ideal reproduction arrangements.

Figure 3:
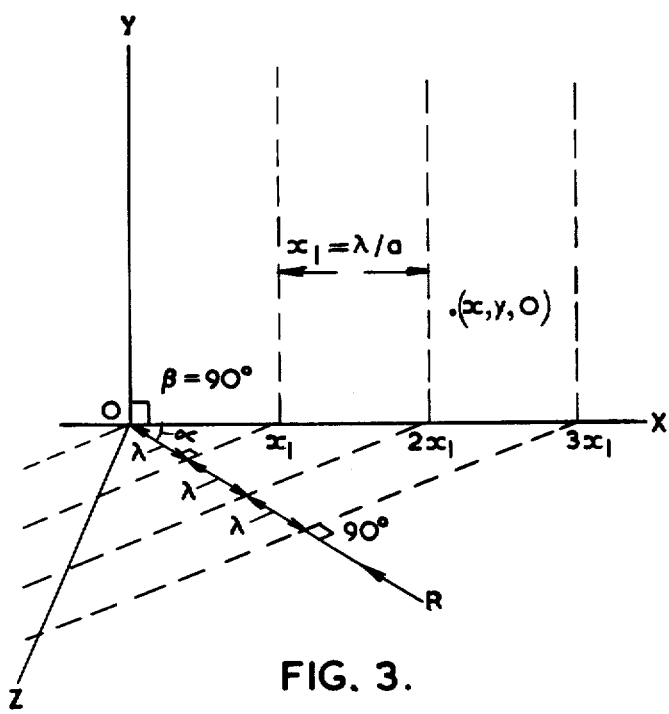
FIGS. 3 and 4 are perspective diagrams illustrating the geometry of typical reference waves which may be simulated by the apparatus of FIG. 2.
Figure 4:
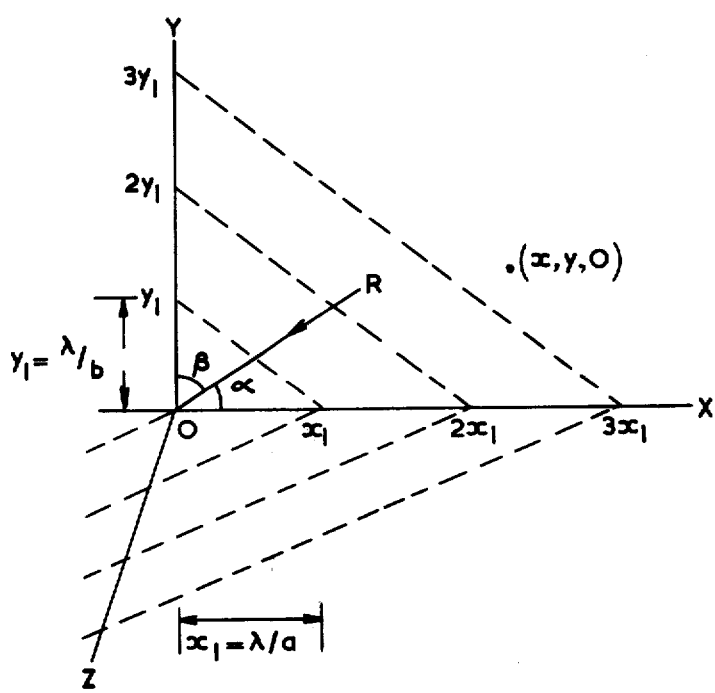

FIGS. 3 and 4 illustrate the geometry of the reference waves to be simulated, with respect to rectangular Cartesian axes OX, OY, OZ. In these drawings the broken lines represent the intersections of the wavefronts of the reference waves with the x-y and x-z planes, at an instant when one wavefront is passing through the origin O. The line RO represents the direction of incidence of the reference waves; the wavefronts must be normal to this line, and intersect it at points spaced one wavelength $\lambda$ apart. FIG. 3 shows the comparatively simple case of plane reference waves incident at 90° to the y-axis, while FIG. 4 shows the more general case of plane reference waves incident at acute angles to both x and y axes. The x-y plane is the scanned plane, in which the measurements are to be made.

The wavefronts clearly intersect the x-axis at points $x_1$ apart, where $x_1$ is given by $a = \cos \alpha = \lambda/x_1$, and in FIG. 4 they intersect the y-axis at points $y_1$ apart where $b = \cos \beta = \lambda/y_1$; in FIG. 3, $b = \cos \beta = 0$ and $y_1$ has become infinite. It follows that the phase difference between the reference wave at the origin O and the reference wave at any arbitrary point $(x, y, 0)$ in the x-y plane is given by $$\phi_2 = 2\pi \left( \frac{x}{x_1} + \frac{y}{y_1} \right) = \frac{2\pi}{\lambda} (a x + b y)$$

Figure 5:
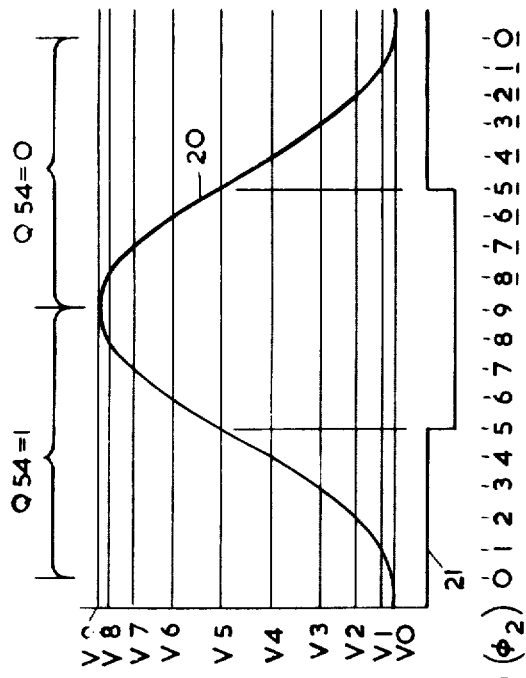
FIG. 5 is a graphical diagram illustrating some signals and selection actions occuring in the apparatus of FIG. 2.

FIG. 5 shows how the selection of appropriate voltages in the switched potential divider 14 determines appropriate corresponding phase increments. The sinusoid curve 20 represents a typical cycle of the signal waveform A cos wt, and the horizontal lines labelled V0 to V9 represent the voltages produced by the switched potential divider 14 under the control of a counter circuit in the scan control unit 12. The waveform 21 represents the output of the comparator 13 during a cycle when the count in this counter is 5 and voltage V5 is developed on the potential divider output. As shown the comparator output goes low when the sine wave exeeds the selected voltage, and rises again when the sine wave falls below the selected voltage. When a sampling time on the rising side of the sine wave is appropriate, the sampling action is initiated from the leading edge of the comparator output pulse, but when a sampling time on the falling side of the sine wave is appropriate, the sampling action is initiated from the trailing edge of the comparator output pulse. The graduations shown at the bottom of the Figure indicate the sampling times which are selected in sequence, and the numbers below them indicate the counts in the counter (reference 59 in FIG. 7, described hereinafter) which cause them to be selected. In the latter half of the cycle these numbers are underlined to indicate selection from the trailing edge of the comparator output. Clearly, this method for selecting the sampling times relies on the waveform being sinusoidal but is substantially independent of its period.

Figure 6:
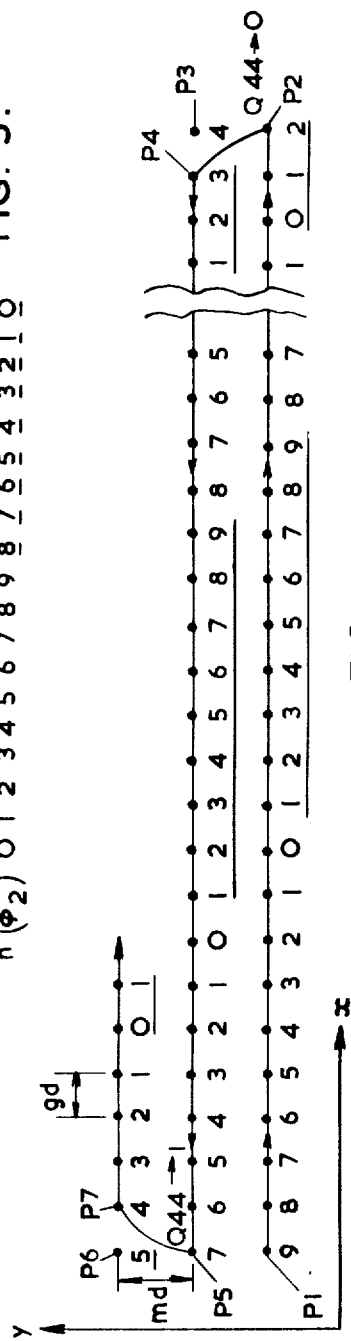
FIG. 6 is a diagram illustrating the scanning and counting actions of the apparatus of FIG. 2, and their relationships.

FIG. 6 is a diagram representing a portion of the scan performed by the receiver transducer 4 with the corresponding counts of the counter (59 in FIG. 7) which controls the voltage selections and hence the sampling times so that $\phi_2 = 2\pi/\lambda (a x + b y)$ as required. The meandering line indicates the path of the focal point of the receiver transducer 4 in the x-y plane, and the spots on this line represent positions at which measurements are taken. It will be noted that altering the sampling time by successive phase increments requires the count to proceed in steps from 9 to 0 and then vice versa; every time a count of 0 or 9 is reached, the direction of count is changed, and the selection is changed from the leading to the trailing edge or vice versa. If a skewed reference wave is to be simulated, some skew pulses have to be added to the count at the end of each line of the scan. Since alternate lines are scanned in opposite directions, the direction of count has to be reversed at the end of every line. Closer study shows that at one end the skew pulses must be counted before the direction of count is reversed; at the other end the direction of count has to be reversed before the skew pulses are counted.

Figure 7:
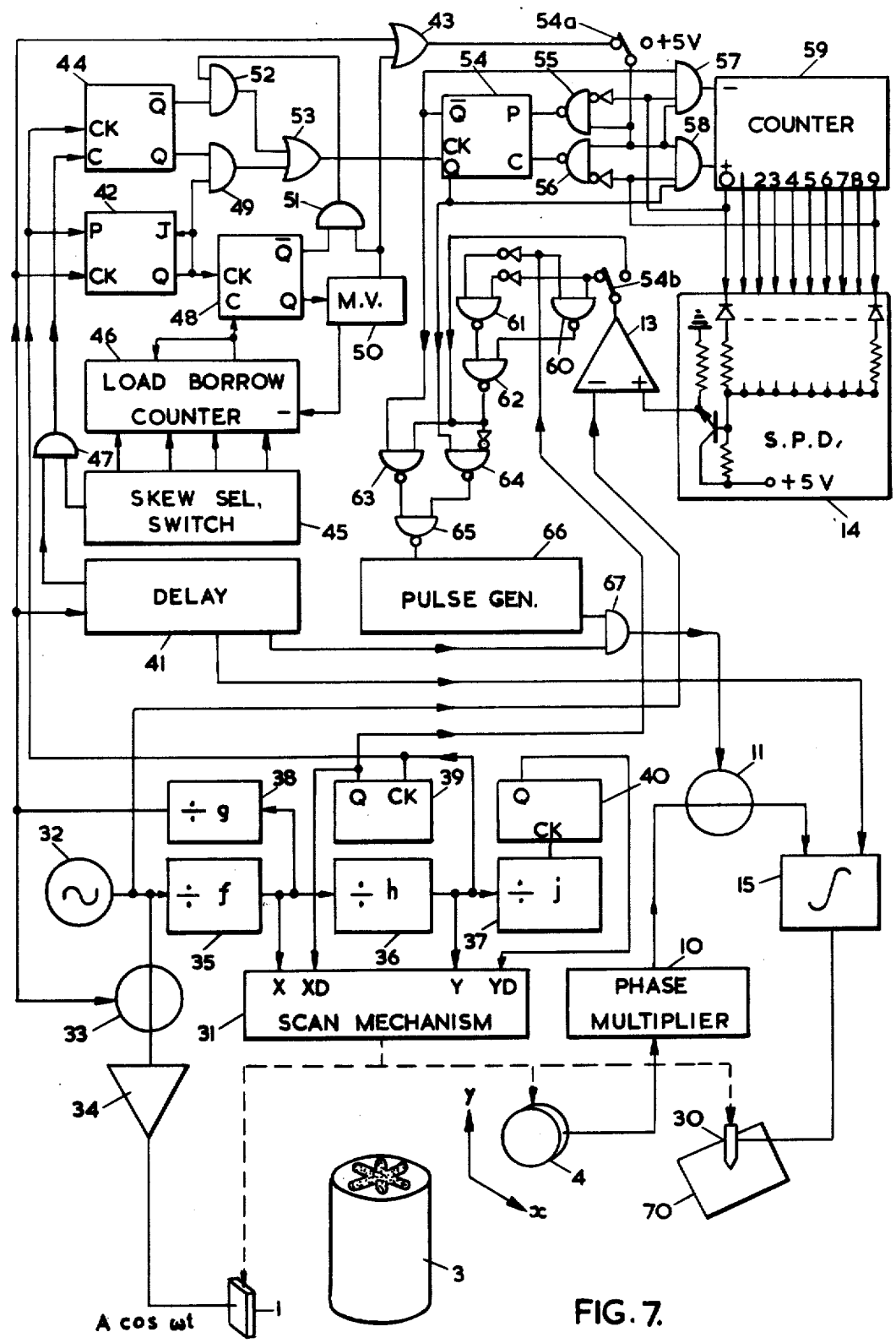
FIG. 7 is a schematic block circuit diagram showing the apparatus of FIG. 2 in greater detail.

FIG. 7 shows the complete apparatus in more detail. Starting at the bottom of the drawing, the transducers 1 and 4 and the object to be tested 3 are arranged as before. As indicated the transducers 1 and 4 and a recording stylus 30 are moved together in a rectilinear scanning motion under the control of an electromechanical scanning mechanism 31. To move both transducers equally is a known technique; it can be shown equivalent to keeping the transmitter fixed and moving the receiver twice as far. This reduces the range of scanning motion required. The signals A cos wt for energising the acoustic transmitter transducer 1 are provided from an oscillator 32 via an analogue gate 33 and power amplifier 34. The oscillator output is also applied to the inverting input of the comparator 13 and to a chain of pulse rate dividers 35, 36, 37. The divider 35 emits one pulse after every $f$ cycles of the oscillator; $f$ determines the number of acoustic-wave cycles transmitted in each position. The output from divider 35 is also applied to another pulse-rate divider 38 and to an X input of the scan mechanism 31, where it controls stepping motors for moving the transducers and stylus by predetermined increments of distance $d$ in the x direction. The divider 38 provides one pulse out for every $g$ pulses which it receives; it controls the gate 33 and hence determines how frequently measurements are made and how far the transducers 1 and 4 and stylus 30 are moved in the x-direction between measurements; as indicated in FIG. 6 this will be a distance $g\ d$. The divider 36 emits one pulse for every $h$ pulses which it receives; this is applied to a Y input of the scan mechanism 31 where it controls stepping motors for moving the transducers and stylus by predetermined increments in the y direction. The factor $h$ therefore controls the number of measurements in each line of the scan. The output of divider 36 is also connected to the clock input of a bistable circuit 39, which controls an XD or x-direction input of the scan mechanism 31 so that the increments of movement made in response to the pulses from divider 35 are in opposite directions in alternate lines as indicated by the arrowheads on the scan path line in FIG. 6. The divider 37 divides by a factor $j$ and controls the clock input of a bistable circuit 40; $j$ determines the number of lines in each complete scan or frame and the bistable circuit 40 controls the sense of scan in the y-direction through a YD input of the scan mechanism 31.

The output of divider 38 is also connected to a delay unit 41, to the clock input of a bistable circuit 42, and to an OR gate 43. The output of the divider circuit 36 is also connected to the clock input of a bistable circuit 44 and to the preset input of the bistable circuit 42. A skew selector switch 45 (used to determine the number of skew pulses if any, to be counted at the end of each line) has several outputs connected to a counter 46. An and-gate 47 has inputs connected to the switch 45 and the delay unit 41, and an output connected to the clear input of the bistable circuit 44.

The bistable circuit 42 has its Q output connected to its own $J$ input and to the clock input of another bistable circuit 48 and to one input of another and-gate 49. The clear input of the bistable circuit 48 is connected to the borrow output and the load control input of the counter 46. The Q output of the bistable circuit 48 controls a multivibrator circuit 50; outputs from this multivibrator 50 are connected to the OR gate 43 and to the decrementing input of the counter 46. Another and-gate 51 has inputs connected to the $\overline{Q}$ output of the bistable circuit 48 and to the multivibrator 50, and an output connected to one input of another and-gate 52. The other inputs of the and-gates 49 and 52 are connected to the Q and $\overline{Q}$ outputs respectively of the bistable circuit 44. The outputs from these gates 49 and 52 are connected through an OR-gate 53 to the clock input of yet another bistable circuit 54.

The output of the OR-gate 43 is connected via a switch 54a to one input of each of two NAND gates 55, 56 and two AND gates 57, 58. (The alternative position of switch 54a applies a constant voltage to these connections. This simulates a reference wave incident normal to the scanned plane forming a Gabor-type hologram. In the following description it is assumed that the switch 54a is as shown connecting OR-gate 43 to gates 55–58).

The outputs from the NAND gates 55, 56 are connected to the preset and clear inputs respectively of the bistable circuits 54. The outputs of the AND gates 57, 58 are connected to decrementing and incrementing inputs respectively of a decimal counter 59. This counter 59 has separate outputs which are individually energised in response to counts from 0 to 9. These respectively control associated sections of the switched potential divider network 14. The count = 0 output of the counter 59 is connected to a second input of the AND gate 57 and through an inverter to a second input of the NAND gate 55. The count = 9 output of the counter 59 is connected to a second input of the AND gate 58 and through an inverter to a second input of the NAND gate 56. The Q output of the bistable circuit 54 is connected to a third input of the AND gate 58 and the $\overline{Q}$ output of the bistable circuit 54 is connected to a third input of the AND gate 57.

As indicated in FIG. 7 the switched potential divider circuit 14 has an emitter-follower output connected to the non-inverting input of the comparator 13. The output of the comparator 13 is connected through a switch 54b directly to a NAND gate 60 and through an inverter to another NAND gate 61. The Q output of bistable 39 is connected directly to NAND gate 60 and through an inverter to NAND gate 61. The outputs of gates 60 and 61 are applied to another NAND gate 62. (The switch 54b is normally in the position shown; in its alternative position, used for making Gabor type holograms, it connects the output of the comparator 13 to the output connection of NAND gate 62). The output from NAND gate 62 is applied directly to a NAND gate 63 and through an inverter to a NAND gate 64. These gates 63 and 64 are controlled by the $\overline{Q}$ and Q outputs respectively of the bistable circuit 54. The outputs of the NAND gates 63 and 64 are connected by another NAND gate 65 to a pulse generator network 66. The output of the pulse generator network 66 passes through a gate 67, which is controlled by a signal from the delay circuit 41, to control the high-speed analogue gate circuit 9. The high-speed analogue gate circuit 9 connects samples of the output of the phase multiplier circuit 10 to the integrating circuit 15. The output of the integrating circuit 15 is used to control the intensity of marks produced by the stylus 30 on a recording medium 70. Another output from the delay circuit 41 is connected to a resetting connection of the integrator 15.

Each section of the switched potential divider 14 includes a diode gate. At any instant, nine of these diodes will be reverse-biased and hence substantially non-conductive because the outputs of the counter 59 are normally high; only one, the output whose serial number equals the present value of the count, will be low allowing the associated diode to conduct. For simplicity suppose that the scan begins, with the Q output of bistable 39 at the one level and the transducer 4 at an arbitrary point P1 with the count = 9 in the counter 59 and the Q output of the bistable circuit 54 at the zero level (low). With the bistable 54 in this state the count must proceed downwards and the leading edge of each pulse from the divider 38 causes the AND gate 57 to apply an incrementing signal to the counter 59. When the count reaches 0 however, the gate 55 changes the state of the bistable circuit 54 making its Q output 1 and its $\overline{Q}$ output 0. The leading edge of the next pulse from the divider 38 then causes the AND gate 58 to apply an incrementing signal to the counter 59, so the count increases by one for each successive measurement. When the count reaches 9 again the bistable 54 is switched by the gate 56 thereby again reversing the direction of count.

During each cycle of the output of the oscillator 32 the comparator 13 will produce one rectangular wave output as indicated at 21 in FIG. 5. The timing of the edges of this rectangular wave will depend on the count of the counter 59. The voltage level V0 is actually slightly above the minimum voltage of the sine wave 20 and the voltage level V9 is slightly below the maximum voltage of the sine wave, although this is not clearly shown in FIG. 5, to ensure that the rectangular wave edges do not disappear at counts of 0 or 9. If this adjustment is not maintained some measurements may be missed but enough will be taken to make an adequate hologram. When the Q output of the bistable circuit 39 is a one signal, indicating forward line scanning (x increments positive), and the counter 59 is in a counting down sequence (Q output of bistable 54 zero) the leading edge of the comparator output causes the gate 65 to apply a negative-going signal to the pulse generating network 66. However, when the counter 59 is counting up and the Q output of 54 is one this control is exercised by the trailing edge of the comparator output. When a line is being scanned in the reverse direction (Q output of 39 zero) the converse applies, ie the leading edge controls when counting up and the trailing edge when counting down. In each case the pulse generator network 66 responds to the signal from the gate 65 by forming a short pulse which will open the high-speed analogue gate 11 once (at the right time determined by $-\phi_2$) which is a function of $(x, y)$ in each cycle, for a period considerably shorter than one-tenth of a period of the oscillator frequency, if the gate 67 is enabled by a signal from the delay unit 41.

The oscillator 32 oscillates continuously; after $f g$ cycles, the output of divider 38 enables the gate 33 to pass a sequence of $f$ consecutive cycles to the power amplifier 34 and transmitter transducer 1. The delay unit 41 also receives the output of the divider 38 and after a delay corresponding to the time taken for the acoustic waves to travel by the shortest path from the transducer 1 to the transducer 4, it enables the gate 67 to pass a sequence of short pulses from the pulse generator network 66 to the high-speed analogue gate 11. The control exercised by the delay unit 41 may be preset to act as a range gate excluding unwanted returns, but should keep the gate 67 enabled for long enough to ensure that the last acoustic wave cycle from the transmitter 1 and travelling through or past the object 3 by the slowest significant route will have reached the transducer 4 before the gate 67 stops passing the pulses to the gate 11.

Hence every time the output of divider 38 is energised, a sequence of $f$ cycles of acoustic oscillation is transmitted by the transducer 1. For each such sequence a number of samples of the receiver transducer output are taken (each sample being taken at the appropriate time in each cycle, depending on the transducer position and determined by the count in counter 59 and associated parts as described hereinabove) and passed to the integrating circuit 5. The resulting output from the integrating circuit 5 determines the density of one spot, or elementary area on the hologram pattern. Another signal from the delay circuit 41 resets the integrator 15 and pulses from divider 35 cause the transducer to move to a new position before the next measurement.

As hereinbefore mentioned, each pulse from the divider 35 causes the transducers 1 and 4 to be moved a distance $d$ in the $x$ direction, so that generally they are moved a distance $g d$ in the $x$ direction between measurements, and the count in the counter 59 is changed by $\pm 1$ just before each measurement. Each $\pm 1$ change in the count changes the phase of the sampling instants by $\pi/9$ radians, and this must be related to a change of $g d$ in the value of the $x$-coordinate. To agree with the required relationship $A \cos \phi_2 = A \cos 2\pi/\lambda (ax + by)$ we must have $\Delta\phi_2 = \pi/9 = (2\pi/\lambda) a g d$ or $18 a g d$; this indicates the parameters of the reference wave which is being simulated. Now, at the end of every line a pulse from the divider 36 causes the transducers to be moved a given distance in the $y$ direction; let this distance be called $md$. Following the equation $A \cos \phi_2 = A \cos 2\pi/\lambda (ax + by)$ a change of $m d$ in the value of the $y$ coordinate should be associated with a change of $2\pi/\lambda b m d$ in the phase $\phi_2$ or $18/\lambda b m d$ times $\lambda/9$; it is convenient to make the angles $\alpha, \beta$ equal, hence $a = b$ and possibly $a = b = \frac{1}{2}$ or $a = b = 0.577$. Now if $b = a = \lambda/(18 g d)$ it follows that the number of skew pulses needed at the end of each line to change the count in the counter 59 appropriately should be $m/g$. If it is desired to have the same resolution in the $x$ and $y$ directions, it will be appropriate to make $m = g$ and have only one skew pulse at the end of each line. However, in some practical applications, resolution in the y direction may be much less important than resolution in the $x$ direction. In such cases the time taken for a complete frame scan can be considerably reduced by making $m > g$ and having fewer lines in each frame. Hence the apparatus of FIG. 7 is provided with a facility for counting a chosen number of skew pulses after each line scan, and for the sake of generality FIG. 6 has been drawn to show a case where two skew pulses have been counted at the end of each line. The chosen number of skew pulses is set up by the skew selector switch 45 and this number minus one is loaded into the counter 46 whenever a line end pulse is generated by the divider 36. If no skew pulses are required, after the last measurement of a line the bistable 44 is clocked and sends a signal through gates 49 and 53 to change the state of bistable 54, and then bistable 44 is cleared at a time when the output of 51 must be zero by a signal from gate 47.

However, when a skew is required, the output of gate 47 remains high and the bistable circuit 44 is switched by every line end pulse from the divider 36. At the end of a line which has been scanned in the direction of increasing $x$ the bistable 44 will be switched to the clear state which makes its $\overline{Q}$ output 1. The bistable 42 is used as an anticoincidence circuit, to delay the skew pulse insertion actions until the last measurement of the line has been completed; it does not respond to the voltage from the divider 36 until the output of divider 38 returns to the 0 level, but then it switches to the set condition bringing its Q output up to the 1 level. This switches the bistable circuit 48, making its Q output 1 and thereby enabling the multivibrator 50 to oscillate. Each oscillation of the multivibrator 50 reduces the count in the counter 46 by one and feeds one pulse through the OR-gate 43, which moves the counter one step further on following the counting sequence established in the preceding line scan. This is repeated until the borrow output of the counter 46 switches the bistable 48 into the clear state; when this happens the multivibrator completes its oscillation, sending the last skew pulse to the OR gate 43. Thus the skew pulses from the multivibrator 50 make the count in counter 59 continue following the pattern 9, 8, 7 . . . 1, 0, 1, 2 . . . 8, 9, 8 established during the line scan, which corresponds to a steady increase in the sampling phase angle $\phi_2$. This will involve a reversal of the direction of counting only if one of the skew pulses brings the count to a value of 0 or 9. However, the $\overline{Q}$ output from the bistable circuit 48 enables the last skew pulse to operate the gate 51, hence sending a signal through the gates 52 and 53 to change the state of the bistable 53 to reverse the direction of subsequent counts in the counter 59.

Thus in the particular example illustrated in FIG. 6, the counter 59 comes to a count of 2, counting up, when the transducer 4 reaches the last point P2 of the first line scan. The output of divider 36 is energised but the bistable 42 delays the skew pulse insertion actions until the measurement at P2 is complete. Then it acts as described hereinabove to send two skew pulses from the multivibrator 50 to the counter 59, taking the count therein two steps onward to a count of 4 while the scan mechanism 31 moves the transducer 4 towards position P3. Then the signal from gate 52 switches the bistable 54, thereby setting the gates 57, 58 for counting upwards. No measurement is taken at P3 and indeed P3 will probably not be reached because pulses from the divider 35 are meanwhile driving the scan mechanism in the $-x$ direction towards P4. When P4 is reached, a pulse from divider 38 decreases the count to 3 and the measurement at P4 is taken as hereinbefore described.

When the scan comes to the end of a line which has been scanned in the direction of decreasing $x$, the bistable 44 is switched to the preset state which makes its Q output 1. The bistable circuit 42 delays the skew insertion actions as before, until the last measurement is complete. However immediately after the bistable 42 acts, it enables the gate 49 to switch the bistable circuit 54 thereby changing the direction of count before the multivibrator 50 starts sending the skew pulses to the gate 41. In the particular example of FIG. 6, the count in counter 59 reaches 7, counting up, as the transducer comes to the point P5 and takes the last measurement. Then the bistable 54 is switched, setting the counter to count down, and the two skew pulses from multivibrator 50 decrease the count to 5 as the scan mechanism moves the transducer towards P7. As the transducer reaches P7 a pulse from divider 38 decreases the count to 4 before the measurement begins.

Ideally the leading/trailing edge selection arrangement should not be changed at the end of a line unless this happens to coincide with a count of 9 or 0; but since in the practical apparatus of FIG. 7 it is dependent on the bistable 54 controlling the direction of count which has to be reversed for the reverse direction scanning of alternate lines, a compensating inversion is provided by the action of the gates 60, 61, 62 under the control of the bistable circuit 39.

Clearly the apparatus could be provided in various alternative or modified forms, as will now be clear to persons skilled in the art.

I claim:

1. Acoustic holography apparatus comprising:
    acoustic transmitter means for insonifying an article or object for examination,
    an acoustic receiver transducer for detecting acoustic signals from the acoustic transmitter means which have passed by or through the said article or object or have been diffracted or reflected therefrom,
    scanning means for producing a displacement of the acoustic receiver transducer relative to the object,
    sampling means for taking substantially instantaneous samples of the amplitude of a signal derived from the acoustic receiver transducer at instants selected relative to the phase of the signal transmitted by the acoustic transmitter means, the selected instants being dependent on the current position of the receiver transducer and being determined according to the phase of a chosen notional reference wave at the current position of the receiver transducer relative to the phase of the chosen notional reference wave at a datum point, and
    plotting means for plotting the samples taken by the sampling means versus the displacement of the acoustic receiver transducer so as to form a graphical diagram representing an acoustical hologram of the object.

2. Acoustic holography apparatus as claimed in claim 1 and wherein a phase-locked frequency-multiplier means is connected to receive the output signal of the acoustic receiver transducer and the sampling means is connected to take the said samples from a harmonic signal output of the phase-locked frequency-multiplier means.

3. Acoustic holography apparatus as claimed in claim 1 and wherein the sampling means comprises a sampling gate circuit connected to receive the signal derived from the acoustic receiver transducer and having an output connected to the plotting means, and a scan control means which comprises a comparator amplifier having a first input connected to the acoustic transmitter means and having a second input with switch means for applying a series of predetermined voltages in sequence to the second input of the comparator amplifier and counting means for operating the switch means in synchronism with the motion of the acoustic receiver transducer relative to the object.

4. Acoustic holography apparatus as claimed in claim 3 and wherein the switch means is constructed to apply voltages to the said second input of the comparator amplifier which are related to each other as the voltages of a sequence of instantaneous samples taken at equal phase increments on a sinusoidal voltage waveform, and the scanning means is constructed for moving the acoustic receiver transducer in steps relative to the object, in synchronism with counting actions of the counting means.

5. Acoustic holography apparatus as claimed in claim 3 and wherein the scanning means is constructed to move the acoustic receiver transducer in a rectilinear raster scan, and to change the direction of counting of the counting means whenever it changes the direction of motion of the acoustic receiver transducer.

6. Acoustic holography apparatus as claimed in claim 5 and wherein the scanning means comprises means for causing a selected number of extra counting actions of the counting means after each line of the raster scan.

7. A method for forming an acoustic hologram pattern which comprises:
    insonifying an object with acoustic waves from a transmitter transducer,
    detecting the acoustic waves scattered by the object to a receiver transducer,
    sampling the instantaneous amplitude of a signal derived from the receiver transducer at selected phase times relative to the phase of the acoustic waves at the transmitter transducer,
    scanning the receiver transducer across a plane, and selecting the said phase times according to a prescribed relationship with the instantaneous position of the receiver transducer, and forming the hologram pattern by plotting the sampled outputs obtained with the receiver transducer in various positions in the plane at corresponding positions in a diagram of the plane.

8. A method as claimed in claim 7 and wherein the output signal of the receiver transducer is applied to a phase-locked frequency-multiplier circuit and a harmonic signal output of the phase-locked frequency-multiplier circuit forms the said signal to which the sampling action is applied.

9. A method for forming an acoustic hologram pattern which comprises:
    insonifying an object with acoustic waves from a transmitter transducer;
    sampling the instantaneous amplitude of a signal representing or derived from the resultant disturbance due to acoustic waves reflected from the object at each of a plurality of positions in a plane at selected phase times relative to the phase of the acoustic waves at the transmitter transducer, the selected phase time in each case being determined according to a prescribed relationship with parameters specifying the position concerned; and forming the hologram pattern by plotting the sampled amplitudes from various positions in the plane at corresponding positions in a diagram of the plane.

10. A method as claimed in claim 9, wherein the selected phase times are determined by reference to a series of voltages which are related to each other as the voltages of a sequence of instantaneous samples taken at equal phase increments on a sinusoidal voltage waveform and which are selected in sequence by counting actions through comparing the selected voltage with the instantaneous voltage of a signal from the transmitter transducer and determining the appropriate sampling instants from the instants when the compared voltages become equal.

11. A method as claimed in claim 9, wherein the sampling action is achieved by moving a receiver transducer through a plurality of positions in the said plane and sampling the instantaneous amplitude of the receiver transducer at selected phase times determined according to a prescribed relationship with the parameters specifying displacements of the receiver transducer from a datum point in the said plane.

12. A method as claimed in claim 9, wherein the sampling action is achieved by moving a receiver transducer through a plurality of positions in the said plane, having a phase-locked frequency-multiplier circuit connected to receive the output of the receiver transducer, and sampling the instantaneous amplitude of a harmonic-signal output of the phase-locked frequency-multiplier circuit at selected phase times determined according to a prescribed relationship with parameters specifying displacements of the receiver transducer from a datum point in the said plane.

* * * * *